(12) United States Patent
Tennebroek et al.

(10) Patent No.: US 8,337,955 B2
(45) Date of Patent: Dec. 25, 2012

(54) AQUEOUS COATING COMPOSITION COMPRISING AN AUTOXIDISABLE AMIDE GROUP CONTAINING RESIN

(75) Inventors: Ronald Tennebroek, Waalwijk (NL); Gerardus Cornelis Overbeek, Waalwijk (NL); Michel Johannes Jan Ruts, Waalwijk (NL); Franciscus Adrianus Cornelis Bergman, Zwolle (NL)

(73) Assignee: DSM IP Assets B.V., Heerlen (NL)

( * ) Notice: Subject to any disclaimer, the term of this patent is extended or adjusted under 35 U.S.C. 154(b) by 207 days.

(21) Appl. No.: 12/919,263

(22) PCT Filed: Mar. 31, 2009

(86) PCT No.: PCT/EP2009/053821
§ 371 (c)(1),
(2), (4) Date: Nov. 30, 2010

(87) PCT Pub. No.: WO2009/121886
PCT Pub. Date: Oct. 8, 2009

(65) Prior Publication Data
US 2011/0059253 A1    Mar. 10, 2011

(30) Foreign Application Priority Data

Mar. 31, 2008 (EP) .................................... 08006271

(51) Int. Cl.
*B05D 3/02*    (2006.01)

(52) U.S. Cl. ....................................... 427/385.5; 427/384
(58) Field of Classification Search .................. None
See application file for complete search history.

(56) References Cited

U.S. PATENT DOCUMENTS

| 2004/0014922 A1* | 1/2004 | Buckmann et al. | 528/10 |
| 2004/0030031 A1* | 2/2004 | Martin et al. | 524/502 |
| 2006/0217483 A1* | 9/2006 | Tennebroek et al. | 524/501 |
| 2011/0086953 A1* | 4/2011 | Tennebroek et al. | 524/104 |

OTHER PUBLICATIONS

International Search Report for PCT/EP2009/053821, mailed Aug. 14, 2009.

* cited by examiner

*Primary Examiner* — Erma Cameron
(74) *Attorney, Agent, or Firm* — Nixon & Vanderhye P.C.

(57) ABSTRACT

An aqueous coating composition comprising an autoxidisable amide group containing resin having $\geq 30$ wt % of fatty acid residues by weight of autoxidisable amide group containing resin; a Tg in the range of from $-40$ to $+35°$ C.; ND×AV$\leq 22$ mg KOH/g; a Mw in the range of from 2,500 to 20,000 g/mol; a PDi less than 10; an amide group content of at least 10 mmoles/100 g solid; and said composition having: a co-solvent content less that 25 wt %; a N-methylpyrrolidone content <13 wt % by weight of solids; a solids content >38 wt %; and when a film, a telegraphing value of less than 20 gloss units.

19 Claims, No Drawings

AQUEOUS COATING COMPOSITION COMPRISING AN AUTOXIDISABLE AMIDE GROUP CONTAINING RESIN

This application is the U.S. national phase of International Application No. PCT/EP2009/053821, filed 31 Mar. 2009, which designated the U.S. and claims priority to European Application No. 08006271.4, filed 31 Mar. 2008, the entire contents of each of which are hereby incorporated by reference.

The present invention relates to certain aqueous coating compositions that comprise an autoxidisable component and processes for making such compositions. Coatings of the invention show reduced telegraphing of surface irregularities after the composition has been applied to a surface.

There is a general need when applying a decorative or protective coating to a substrate to obtain a smooth surface without visible irregularities. The degree to which an underlying surface can be visually ascertained through a coating is often described as telegraphing. It has been found that irregularities on substrates (such as wood), which contribute to the roughness, are often telegraphed through conventional aqueous coatings.

Thicker coating materials are often used to reduce telegraphing because they are sufficiently able to level out any unevenness in the surface. Thus the underlying surface roughness of the substrate shows through to a reduced extent into the final coating which appears visually smooth. However, thicker coatings are disadvantageous because they may need to be applied in several layers, increasing the cost. Also slower through-drying, wrinkling and sagging can occur when using thicker layers.

Organic solvents have been used to improve telegraphing. However with a continuing concern about the use of organic solvents there has been a long felt need for an aqueous coating composition with comparable properties to those achievable using compositions based on organic solvents.

A coating should also dry sufficiently quickly to avoid the adherence of dust and ensure that the coating quickly becomes water resistant (e.g. in case of outdoor applications) and/or tack-free.

Aqueous compositions such as water dilutable traditional autoxidisable polyesters (also known as water dilutable alkyds or alkyd emulsions) have also been used to address the issue of telegraphing. However these systems have many well known problems.

Water dilutable autoxidisable alkyds may suffer from backbone hydrolysis. This may lead to changes in the performance over time which is undesirable. Traditional alkyd emulsions are discussed in "Water borne and solvent based alkyds and their end user applications" by N. Tuck, volume VI, Wiley/Sita Series In Surface Coatings technology; (ISBN 471985910) published in 2000.

Another common problem of traditional alkyd emulsions is their tendency to produce cissing (also known as crawling) when applied as an over-coat. Cissing is when a coating refuses to form a continuous film, recedes from the surface, collects in beads and leaves the surface partially exposed thus reducing the appearance of the painted object.

Yet another disadvantage of traditional alkyd systems, especially those containing a relatively high percentage of unsaturated fatty acid residues, is their pronounced tendency to yellow (in light or dark) over time.

Current coatings lack some or all of the above mentioned performance characteristics, so coatings which exhibit reduced telegraphing with a combination of: minimal hydrolysis of the backbone of the alkyd, low yellowing over time and/or reduced cissing are desired.

It is also generally known that polyester based alkyds typically have a broad molecular weight distribution (MWD) and thus comprise a significant amount of material having a low molecular weight, which dries more slowly and therefore means the coating remains tacky for a longer period (i.e. has long tack free times). The presence of material of lower molecular weight cannot be avoided for many reasons. For example both glycerol (with three fatty acids—triglycerides) and pentaerythritol (with four fatty acids) are common raw materials used to prepare polyester based alkyds. To address the issues raised by the presence of the low molecular weight fraction, polyester based alkyds may be prepared in a highly branched form to obtain a high molecular weight fraction that dries more quickly. However the resultant branched polyester based alkyds have a significantly increased viscosity and reduced flow (compared to the less branched equivalent) and thus must be diluted with more organic solvent before they can be used. This is undesirable as for example it increases the amount of volatile organic compounds (VOCs) and adversely effects the flow of the composition.

Prior aqueous coatings have not been widely accepted in many markets as alternatives to solvent based coatings. For example solvent based alkyds are still preferred in the decorative market, where very low telegraphing is required as these coatings are often applied by brush. It is also desired that aqueous compositions are not milky or opaque but clear or transparent.

WO 2007/147559 describes water soluble fatty acid functional hyperbranched polyamides. The resins are water soluble, due to a relatively high OH content and a low fatty acid level. This is less desirable due to the effect it has on water resistance and rate of cure and therefore on final properties.

EP 1,337,577 describes amide and fatty acid functional oligomers, containing N-methylpyrrolidone (NMP) as solvent. This will result in slow drying, due to interference of the NMP with the drier salt, which is undesirable.

U.S. Pat. No. 6,359,060 describes fatty acid functional polyurethanes, containing large amounts of NMP, which will impair the rate of cure and has a negative effect on yellowing.

U.S. Pat. No. 7,342,068 describes fatty acid polyurethanes with a Mw which is too high to obtain the required flow during drying. In addition to this, the polyurethanes are isocyanates terminated before dissipation into water, which gives an increase in the Mw distribution, thus increasing the MWD, which is undesirable.

Thus with the continuing concern about the use of organic solvent based coatings there has been a long felt need for an aqueous coating composition with comparable properties to those achievable using organic solvent based compositions.

We have now found ways to overcome the above mentioned disadvantages, especially when combinations of more then one of the problems need to be overcome in one coating system.

It is an object of the invention to solve some or all of the problems identified herein. A preferred object of the invention provides a method of improving the appearance of coated substrates, when the substrates contain visual irregularities.

A coating should also dry sufficiently quickly to avoid the adherence of dust and to ensure that the coating quickly becomes water resistant (in case of outdoor applications) and tack-free.

In a more preferred object of the invention the method can be used with a wide variety of coating compositions.

We have now surprisingly found that incorporation of certain polar groups, such as urethane, urea or amide groups, more particularly amide groups, preferably in low molecular weight alkyds with a relatively narrow molecular weight distribution and within certain glass transition (Tg) ranges gives a desirable combination of good flow and reduced telegraphing, which dry relatively fast.

Therefore according to the present invention there is provided an aqueous coating composition comprising an autoxidisable amide group containing resin, said autoxidisable amide group containing resin having:
i) $\geq$30 wt % of fatty acid residues by weight of autoxidisable amide group containing resin;
ii) a Tg in the range of from −40 to +35° C.;
iii) the following relationship:

$$ND \times AV \leq 22 \text{ mg KOH/g}$$

where AV=acid value and where ND=neutralization degree of acid groups on the autoxidisable amide group containing resin; and
iv) a Mw in the range of from 2,500 to 20,000 g/mol;
v) a PDi less than 10;
vi) an amide group content of at least 10 mmoles/100 g solid of autoxidisable amide group containing resin; and
said composition having:
b) a co-solvent content less that 25 wt % by weight of solids;
c) a N-methylpyrrolidone content <13 wt % by weight of solids;
d) a solids content >38 wt %;
said composition when in the form of the film having a telegraphing value of less than 20 gloss units;
where the telegraphing value is the difference between an initial smooth gloss value minus an initial rough gloss value of the film, where
the initial smooth gloss value is the gloss when the film is cast on smooth PVC ($R_z$=1 μm [±0.25 μm]);
the initial rough gloss value is the gloss when the film is cast on rough PVC ($R_z$=25 μm [±5 μm]); and where
each film has a dry film thickness of 52 μm [±6 μm]; and
each initial gloss value is measured at a 20° angle, one day (24 h) after the film has been cast.

As used herein PVC means a polyvinylchloride substrate as described in the test methods herein.

The telegraphing values herein will be positive numbers. In general the greater the reduction in telegraphing, the smaller will be the telegraphing value.

Dry film thickness herein is theoretically calculated from the solid content of the wet layer applied. As used herein, unless the context indicates otherwise, the terms 'standard conditions' denotes a relative humidity of 50%±5%, ambient temperature and an air flow less than or equal to 0.1 m/s; and 'ambient temperature' denotes 23° C.±2° C.

The composition is preferably a non-adhesive composition. As used herein the term 'non-adhesive composition' denotes any composition that does not remain substantially tacky after drying under ambient conditions for a length of time which would be commercially acceptable. Preferred non-adhesive compositions are those which have a tack-free time of less than 16 hours. Tack-free time may conveniently be measured as described herein.

Compositions of the invention dry fast, for example they have short dust- and/or tack-free times. Compositions of the invention have other advantages. They may be prepared with lower viscosities, i.e. less solvent is needed to achieve a certain viscosity suitable for coating applications and in aqueous systems lower viscosity can reduce telegraphing. Alternatively compositions with a similar solvent content to the prior art can be produced with a higher overall molecular weight. Compositions of the invention can also be prepared with a high solids content.

For all upper and lower boundaries of parameters herein, the boundary value is included and all combinations of boundary values may be used to define preferred ranges.

It will be understood that the sum of the amount of all the ingredients that comprise a composition of the invention (or part thereof) when expressed as a percentage of the composition (or the same part thereof) will total 100%.

Preferred compositions of the invention produce coatings that have a telegraphing value (as defined herein) of less than 8 gloss units, more preferably less than 5 gloss units and most preferably less than 2 gloss units.

Preferably the gloss measured at a 20° angle on the film cast on rough PVC should not deteriorate significantly over time. This can be measured as a 'gloss decay' defined as the initial rough gloss value minus a rough gloss value measured at a later specified time. Preferably the gloss decay is measured 4 days, more preferably 7 days and most preferably 14 days after film formation. Preferred values of gloss decay (for example after each of the periods given above) are less than 10 gloss units, more preferably less than 5 gloss units and especially less than 2 gloss units.

Preferably the autoxidisable amide group containing resin crosslinks at ambient temperature. By crosslinking by autoxidation is meant that crosslinking results from oxidation occurring in the presence of air and usually involves a free radical mechanism and is preferably metal-catalysed resulting in covalent crosslinks. Suitably autoxidation is provided for example by fatty acid residues containing unsaturated bonds and/or by allyl functional residues and/or β-keto ester groups. Preferably autoxidation is provided at least by fatty acid residues containing unsaturated bonds.

As used herein 'fatty acid residue', means fatty acids, simple derivatives thereof (such as esters (e.g. $C_{1-4}$alkyl esters), salts, soaps, oils, fats and/or waxes) and mixtures thereof. Fatty acids may comprise a limited number of other substituents such as hydroxyl groups and may be saturated or mono or poly-unsaturated.

For the purpose of determining the fatty acid residue content of the autoxidisable amide group containing resin, it is convenient to use the weight of the fatty acid reactant including the ester group formed by the terminal acid group of the fatty acid molecule.

Preferably the concentration of fatty acid residues in the autoxidisable amide group containing resin is $\geq$33 wt %, more preferably $\geq$38 wt % and most preferably $\geq$43 wt % by weight based on the weight of the resin.

Preferably the concentration of fatty acid residues in the autoxidisable amide group containing resin is $\leq$70 wt %, more preferably $\leq$65 wt % and especially $\leq$59 wt % by weight based on the weight of the resin.

Preferably $\geq$80 wt % and more preferably 100 wt % of the fatty acid residues in the autoxidisable resin are $C_{10}$ to $C_{30}$, preferably $C_{16}$ to $C_{20}$ fatty acid residues.

An iodine number may be used to indicate the amount of unsaturation contained in fatty acid residues where a higher iodine number indicates more unsaturated double bonds are present. For autoxidisable amide group containing resins used in the invention, unsaturated fatty acid residues having an iodine number of at least 50, more preferably at least 80 and most preferably at least 100 g $I_2$/100 g fatty acid are preferred. Preferably unsaturated fatty acid residues having an iodine number of less than 200, more preferably less than 180 and especially less than 150 g $I_2$/100 g fatty acid are preferred. The iodine number may be defined according to DIN 53 241-1 as the quotient of the amount of iodine which is added on to the unsaturated groups (double bonds), with decolourisation, of a sample to be analysed.

Fatty acid residues may be obtained from natural and/or artificial sources. Natural sources include animal sources and/or plant sources. Animal sources may comprise animal fat, butter fat, fish oil, lard, liver fats, sperm whale oil and/or tallow oil and waxes. Examples of waxes are beeswax, candelia and/or montan. Plant sources may comprise waxes and/or oils such as vegetable oils and/or non-vegetable oils. Examples of plant oils are: bitter gourd, borage, calendula, canola, castor, china wood, coconut, conifer seed, corn, cottonseed, dehydrated castor, flaxseed, grape seed, *Jacaranda mimosifolia* seed, linseed, olive, palm, palm kernel, peanut, pomegranate seed, rapeseed, safflower, snake gourd, soya (bean), sunflower, tung, and/or wheat germ. Artificial sources include synthetic waxes (such as micro crystalline and/or paraffin wax), distilling tall oil (a by-product of processing pine wood) and/or synthesis (for example by chemical and/or biochemical methods). Suitable fatty acids also include (Z)-hexadan-9-enoic [palmitoleic] acid ($C_{16}H_{30}O_2$), (Z)-octadecan-9-enoic [oleic] acid ($C_{18}H_{34}O_2$), (9Z,11E,13E)-octadeca-9,11,13-trienoic [α(alpha)-eleostearic also α-oleostearic] acid ($C_{18}H_{30}O_2$) (where α-eleostearic acid comprises >65% of the fatty acids of tung oil), licanic acid, (9Z,12Z)-octadeca-9,12-dienoic [linoleic] acid ($C_{18}H_{32}O_2$), (5Z,8Z,11Z,14Z)-eicosa-5,8,11,14-tetraenoic acid [arachidonic acid] ($C_{20}H_{32}O_2$), 12-hydroxy-(9Z)-octadeca-9-enoic [ricinoleic] acid ($C_{18}H_{34}O_3$), (Z)-docosan-13-enoic [erucic] acid ($C_{22}H_{42}O_2$), (Z)-eicosan-9-enoic [gadoleic] acid ($C_{20}H_{38}O_2$), (7Z,10Z,13Z,16Z,19Z)-docosa-7,10,13,16,19-pentaenoic [clupanodonic] acid and/or combinations thereof.

Fatty acid residues may be obtained and/or obtainable from a plurality of the above sources and/or other sources not listed herein.

Preferably at least 40% by weight, more preferably at least 60% by weight, of the unsaturated fatty acid groups contain at least two unsaturated groups.

However a known problem with many autoxidisable coating compositions is that the resultant coatings have a tendency to yellow, in particular where the autoxidisable groups are derived from polyunsaturated fatty acids may be less acceptable depending on the desired colour of the resultant coating.

To reduce yellowing, the autoxidisable amide group containing resin preferably comprises unsaturated fatty residues that comprise <10 wt %, more preferably <7 wt %, most preferably <4 wt % and especially <2 wt % of fatty acid residues containing three or more double bonds. Examples of fatty acid residues containing three or more double bonds include linolenic acid, tung oil fatty acid, oleostearic acid, arachidonic acid and clupanodonic acid.

The autoxidisable amide group containing resin may be obtained from a mixture of conjugated and non-conjugated unsaturated fatty acid residues. Preferably the autoxidisable amide group containing resin is obtained from 20 to 70 wt % of conjugated and 80 to 30 wt % of non-conjugated fatty acid residues. Fatty acid residues having conjugated double bonds are obtained by catalytic isomerisation of natural fatty acids or from dehydrated castor oil. Conjugated oil is preferably obtained by dehydration of castor oil.

If the autoxidisable amide group containing resin comprises saturated fatty acid residue then it preferably comprises from 0 to 40 wt % of saturated fatty acid residue by weight of total fatty acid residue in the resin, more preferably 0 to 20 wt % and most preferably 2 to 18 wt % as long as an autoxidation of the resin is not impaired. Examples of saturated fatty acids include but are not limited to butanoic [butyric] acid ($C_4H_8O_2$), pentanoic [valeric] acid ($C_5H_{10}O_2$), decanoic [capric] acid ($C_{10}H_{20}O_2$), dodecanoic [lauric] acid ($C_{12}H_{24}O_2$), tetradecanoic [myristic] acid ($C_{14}H_{28}O_2$), hexadecanoic [palmitic] acid ($C_{16}H_{32}O_2$), octadecanoic [stearic] acid ($C_{18}H_{36}O_2$), eicosanoic [arachidic] acid ($C_{20}H_{40}O_2$) and docosanoic [behenic] acid ($C_{22}H_{44}O_2$).

Particularly preferred are autoxidisable amide group containing resins in which the autoxidisable groups are mainly derived from fatty acid residues, more preferably unsaturated fatty acid residues, most preferably fatty acid residues having two or more double bonds, especially conjugated fatty acid residues.

The crosslinking of the autoxidisable amide group containing resin herein is by autoxidation. In a preferred embodiment, metal ion crosslinking is used in combination to the autoxidation mechanism, e.g. by use of coordinative driers as is well known by those skilled in the art. Optionally (although less preferred) autoxidation is used in combination with other crosslinking mechanisms as are known in the art. Other crosslinking mechanisms known in the art include the reaction of siloxane functional groups, Schiff base crosslinking, epoxy groups reacting with amino, carboxylic acid or mercapto groups, the reaction of amine or mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylene diamine or multifunctional amine terminated polyalkylene oxides) with β-diketo (for example acetoacetoxy or acetoamide) groups to form enamines.

We have found that a minimal level of ring structures in the autoxidisable amide group containing resin is useful to reach the final coating properties.

Preferably the autoxidisable amide group containing resin comprises at least 5 wt %, more preferably at least 10 wt % of ring structures. Examples of suitable ring structures include rings originating from isophthalic acid, phthalic acid, hexahydrophthalic acid (and their anhydrides) and dimethylol cyclohexane. For the purpose of calculation of wt % rings only, irrespective of the exact structure, an aromatic ring ($C_6H_4$) has an Mn of 76 and an aliphatic ring ($C_6H_{10}$) has an Mn=82.

The presence of at least 5 wt % of ring structures in the autoxidisable amide group containing resin has been found to significantly improve final coating properties, such as hardness, block resistance and drying times.

A problem often encountered in waterborne autoxidisable resins is their poor hydrolytical stability, which is a particular problem when polymer bound carboxylic acid groups are used, especially when in neutralized form. This problem can be reduced significantly by reducing the degree of water solubility of the autoxidisable resin. However in practice a balance between hydrolytical stability and water solubility is required.

The autoxidisable amide group containing resin may contain bound hydrophilic water-dispersing groups. These types of hydrophilic groups are well known in the art, and can be ionic water-dispersing groups or non-ionic water-dispersing groups. Preferred non-ionic water-dispersing groups are polyalkylene oxide groups, more preferably polyethylene oxide groups. A small segment of the polyethylene oxide group can be replaced by a propylene oxide segment and/or butylene oxide segment, however the polyethylene oxide group should still contain ethylene oxide as a major component. When the water-dispersible group is polyethylene oxide, the preferred ethylene oxide chain length is ≧4 ethylene oxide units, preferably ≧8 ethylene oxide units and most preferably ≧15 ethylene oxide units. Preferably the autoxidisable amide group containing resin if containing polyalkylene oxide groups has a polyethylene oxide content of >0%, more preferably ≧2%, most preferably ≧3.5% and especially preferably ≧5% by weight. Preferably the autoxidisable amide group containing resin has a polyethylene oxide content of ≦50% by weight, more preferably ≦30% by weight, most preferably ≦15% by weight and especially ≦9% by weight. Preferably the polyethylene oxide group has a Mw from 175 to 5000 g/mol, more preferably from 350 to 2200 g/mol and most preferably from 660 to 2200 g/mol.

Preferred ionic water-dispersing groups are anionic water-dispersing groups, especially carboxylic, phosphate, phosphonate or sulphonic acid groups. Most preferred are carboxylic or sulphonic acid groups. Conversion to the salt form is optionally effected by neutralisation of the autoxidisable amide group containing resin with a base, preferably during the preparation of the autoxidisable amide group containing resin and/or during the preparation of the composition of the present invention. The anionic dispersing groups may in some cases be provided by the use of a monomer having an already neutralised acid group in the autoxidisable amide group containing resin synthesis so that subsequent neutralisation is unnecessary. If anionic water-dispersing groups are used in combination with a non-ionic water-dispersing group, neutralisation may not be required.

If the anionic water-dispersing groups are neutralised, the base used to neutralise the groups is preferably, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives the required counter ion desired for the composition. For example, preferred counter ions include tertiary amines, $Li^+$, $Na^+$, $K^+$, $NH_4^+$ and substituted ammonium salts.

Cationic water dispersible groups can also be used, but are less preferred. Examples include pyridine groups, imidazole groups and or quaternary ammonium groups which may be neutralised or permanently ionised.

Due to the influence that neutralisation agents have on yellowing, tertiary amines and/or LiOH, NaOH and KOH are especially preferred.

The autoxidisable amide group containing resin preferably has an acid value (AV) in the range of from 0 to 60 mg KOH/g, more preferably in the range of from 0 to 40 mg KOH/g and still more preferably in the range of from 2 to 18 mg KOH/g and most preferably 5 to 12 mg KOH/g.

The autoxidisable amide group containing resin, if carboxylic acid functional, conforms to the following relationship:

ND×AV≦22 mg KOH/g

More preferably ND×AV≦12 mg KOH/g and most preferably ≦8 mg KOH/g.

ND (neutralization degree of the acid groups on the autoxidisable amide group containing resin) is defined as follows: if the level of neutralizing agent present in the autoxidisable amide group containing resin is sufficient to neutralize for instance 80% of the acid groups, then the ND is 0.8 mg KOH/g.

The autoxidisable amide group containing resin preferably has an hydroxyl number of ≦60 mg KOH/g, more preferably ≦40 mg KOH/g and most preferably ≦25 mg KOH/g.

Preferably the weight average molecular weight (Mw) of the autoxidisable amide group containing resin is ≧3,500 g/mol and more preferably ≧4,500 g/mol. Preferably the weight average molecular weight (Mw) of the autoxidisable amide group containing resin is ≦15,000 g/mol, more preferably ≦12,000 g/mol and most preferably ≦9,000 g/mol. Preferably the Mw is measured by GPC with polystyrene standards as described herein.

Preferably a significant part of any crosslinking reaction only takes place after application of the aqueous coating composition to a substrate, to avoid an excessive molecular weight build up which may lead to an increased viscosity of the aqueous coating composition on the substrate in the early stages of drying.

The molecular weight distribution (MWD) of the autoxidisable amide group containing resin has an influence on the viscosity of the polymers in the composition and hence an influence on the telegraphing. MWD is conventionally described by the polydispersity index (PDi). PDi is defined as the weight average molecular weight divided by the number average molecular weight (Mw/Mn) where lower values are equivalent to lower PDi's. It has been found that a lower PDi often results in lower viscosities for a given Mw autoxidisable amide group containing resin. Preferably the autoxidisable amide group containing resin has a PDi less than 7, most preferably less than 5.5 and especially less than 4.

Preferably the average particle diameter (i.e. the particle size—since the particles are essentially spherical) of the autoxidisable amide group containing resin is <2000 nm, more preferably <1500 nm and most preferably <750 nm.

Preferably at least 80% of the particles have an average particle diameter between 120 and 1500 nm. The particle diameter may be averaged by intensity (Z-average) and measured using a Zetasizer 3000HS from Malvern.

The glass transition temperature (Tg) of the autoxidisable amide group containing resin (100% solids) may vary within a wide range. The Tg (as measured by DSC) is preferably higher than −35° C., more preferably higher than −30° C. and still more preferably higher than −20° C. The Tg is preferably less than 25° C., more preferably less than 15° C. and most preferably less than 10° C.

In case the Tg can not be measured by DSC because the first derivative of the DSC curve does not show any identifiable maximum, an alternative method for determining the Tg is by calculating the Tg using the following equation that relates viscosity of the pure resin to its Tg (derived from the Williams-Landau-Ferry (WLF) equation):

$$Ln(\eta)=27.6-[40.2\times(T-Tg)]/[51.6+(T-Tg)]$$

where:
Ln(η)=Natural logarithm of the viscosity of the pure resin expressed in Pa·s (measured at 23° C.+/−1° C. using a shear rate between 0.005 and 1 s$^{-1}$)
T=23° C.+/−1° C. (temperature used to measure the viscosity of the pure resin) and
Tg=glass temperature expressed in ° C.

An autoxidisable amide group containing resin may be formed by a condensation reaction of for examples molecules having acid or anhydride functionalities with molecules having amine functionalities. By having more than one of such functional groups polymers may be formed. By having even more functional groups it is possible to form hyperbranched amide group containing resins as are well known in the art.

It is also possible to react a branched amide group containing resin that is still hydroxyl functional with isocyanates (preferably 1 to 20 wt %, more preferably 1 to 12 wt % and especially 1 to 7 wt % on solids) to give an amide group and urethane group containing resin (urethanised resin). The use of diisocyanates, to for example increase the molecular weight is preferred. This may also have a positive effect on the hydrolytical stability and drying rate of the resulting resins.

The autoxidisable amide group containing resin may be prepared using conventional polymerisation processes known to be effective for polyester synthesis. General processes for the preparation of alkyd polyesters are described in "Alkyd Resin Technology" by T C Patton, Publisher John Wiley & sons Inc. (1962). General methods for preparing crosslinkable polyesters are also disclosed in EP 486092, U.S. Pat. Nos. 3,494,882, 4,251,406, EP 0000087, WO 95/02019, U.S. Pat. No. 5,378,757 and GB 2306489. Thus, it is well known that polyesters, which contain carbonyloxy (i.e. —C(═O)—O—) linking groups may be prepared by a condensation polymerisation process in which monomers providing an "acid component" (including ester-forming derivatives thereof) is reacted with monomers providing a "hydroxyl component". The monomers providing an acid component may be selected from one or more polybasic carboxylic acids such as di- or tri-carboxylic acids or ester-forming derivatives thereof such as acid halides, anhydrides or esters. The monomers providing a hydroxyl component may be one or more polyhydric alcohols or phenols (polyols) such as diols, triols, etc. It is to be understood, however, that the amide group containing resin contains, if desired, a proportion of amide groups —C(═O)—NH— (i.e. amide linking group) or —C(═O)—N—$R_2$ (tertiary amide linking group) by including an appropriate amino functional reactant as part of the hydroxyl component or alternatively all of the hydroxyl component may comprise amino functional reactants, thus resulting in a polyamide resin; such amide linkages are in fact useful in that they are more hydrolysis resistant.

There are many examples of carboxylic acids (or their ester forming derivatives such as anhydrides, acid chlorides, or lower alkyl esters) which can be used in the autoxidisable amide group containing resin synthesis for the provision of the monomers providing an acid component. Examples include, but are not limited to monofunctional acids such as (alkylated) benzoic acid and hexanoic acid; and $C_4$ to $C_{20}$ aliphatic, alicyclic and aromatic dicarboxylic acids (or higher functionality acids) or their ester-forming derivatives. Specific examples include adipic acid, fumaric acid, maleic acid, succinic acid, itaconic acid, azeleic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, fatty acid dimers, isophthalic acid, 5-sodiosulpho isophthalic acid, phthalic acid and tetrahydrophthalic acid. Anhydrides include succinic, maleic, phthalic, trimellitic and hexahydrophthalic anhydrides.

Preferably the autoxidisable amide group containing resin comprises <5 wt %, more preferably <2 wt % and most preferably 0 wt % of TMA (trimellitic acid and or trimellitic anhydride). It has been found that the use of TMA tends to result in hydrolysis and less durability of the autoxidisable polyester resin.

Preferably the autoxidisable amide group containing resin comprises <15 wt %, more preferably <6 wt %, most preferably <3 wt % and especially 0 wt % of phthalic acid, phthalic anhydride and or benzoic acid. Reduced levels of phthalic acid, phthalic anhydride and benzoic acid in the polyester may improve the hydrolytical (backbone) stability.

Similarly there are many examples of polyols which may be used in the autoxidisable amide group containing resin synthesis for the provision of the monomers providing a hydroxyl component. The polyols preferably have from 1 to 6 (more preferably 2 to 4) hydroxyl groups per molecule. Suitable monofunctional alcohols include for example eicosanol and lauryl alcohol. Suitable polyols with two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols with three hydroxy groups per molecule include triols such as trimethylolpropane (TMP) and 1,1,1-tris (hydroxymethyl)ethane (TME). Suitable polyols with four or more hydroxy groups per molecule include bis-TMP, pentaerythritol (2,2-bis(hydroxymethyl)-1,3-propanediol), bis-pentaerythritol and sorbitol (1,2,3,4,5,6-hexahydroxyhexane). Examples of hydroxyl functional amines with both hydroxyl functionality and amine functionality are described in, for example, WO 00/32708, use of diisopropanolamine is preferred. These can be used to prepare polyester-amides or amide group containing resins.

The esterification polymerisation processes for making the autoxidisable amide group containing resin for use in the invention composition are well known in the art and need not be described here in detail. Suffice to say that they are normally carried out in the melt optionally using catalysts such as tin-based catalysts and with the provision for removing any water (or alcohol) formed from the condensation reaction.

The autoxidisable urethanised amide group containing resin may be prepared in a conventional manner by reacting organic polyisocyanates with a hydroxyl-functional fatty acid functional amide group containing resin.

Suitable polyisocyanates include aliphatic, cycloaliphatic, araliphatic, aromatic and/or polyisocyanates modified by the introduction of urethane, allophanate, urea, biuret, carbodiimide, uretonimine, urethdione or isocyanurate residues. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, α,α'-tetramethylxylene diisocyanate, 1,4-phenylene diisocyanate, 2,4-toluene diisocyanate, 2,6-toluene diisocyanate, 4,4'-diphenylmethane diisocyanate, polymethylene polyphenyl polyisocyanates, 2,4'-diphenylmethane diisocyanate, 3(4)-isocyanatomethyl-1-methyl cyclohexyl isocyanate, 1,5-naphthylene diisocyanate and mixtures thereof. Preferred polyisocyanates are isophorone diisocyanate, 4,4'-dicyclohexylmethane diisocyanate, toluenediisocyanate and 4,4'-diphenylmethane diisocyanate.

Preferably, a hydroxyl- or carboxyl-terminated autoxidisable urethanised resin may be prepared directly by reacting the reactants in proportions corresponding to a ratio of isocyanate groups to isocyanate-reactive groups of ≧0.05:1, more preferably ≧0.1:1 and preferably a ratio of isocyanate groups to isocyanate-reactive groups of ≦1.0:1, more preferably ≦0.85:1, most preferably ≦0.75:1 and especially ≦0.5:1.

Alternatively, an isocyanate-reactive autoxidisable amide group containing resin is first reacted with a polyisocyanate, followed by functionalisation to provide additional stabilising groups.

Preferably the resin is free of NCO groups when dissipated into water.

If desired, catalysts such as dibutyltin dilaurate and stannous octoate, zirconium or titanium based catalysts may be used to assist the urethanisation reaction.

Preferably the amide group containing resin has an amide group content (defined as the presence of NH—C=O or N—C=O in mmoles/100 g solid amide group containing resin) of at least 15 mmoles/100 g solid amide group containing resin, more preferably at least 25 mmoles/100 g, most preferred at least 50 mmoles/100 g solid resin and especially 65 mmoles/100 g solid amide group containing resin.

In addition, the amide group containing resin preferably has a amide group content (defined as the presence of NH—C=O or N—C=O in mmoles/100 g solid autoxidisable amide group containing resin) of $\leq$500 mmoles/100 g solid amide group containing resin, more preferably $\leq$400 mmoles/100 g solid amide group containing resin, most preferably $\leq$300 mmoles/100 g solid amide group containing resin and especially $\leq$225 mmoles/100 g solid amide group containing resin.

In a further preferred embodiment, the coating composition comprises an autoxidisable amide group containing resin obtained from components comprising:
   i) at least 10 to 45 wt %, more preferably 15 to 40 wt % of acids containing a ring or anhydrides containing a ring;
   ii) 33 to 65 wt % of fatty acid residues having an iodine value between 80 and 155 g $I_2$/100 g;
   wherein the fatty acid residues contain less than 10 wt % of fatty acid residues that contain 3 or more double bonds;
   iii) 10 to 30 wt % of components with hydroxyl functionality and/or amino functionality;
   iv) 0.5 to 7 wt % of polyisocyanate;
   wherein i)+ii)+iii)+iv)=100%.

The autoxidisable amide group containing resin may be dispersed (or emulsified) in water using techniques well known in the art. This type of autoxidisable amide group containing resin normally requires the use of an external surfactant (a type of dispersing agent) when being dispersed into water. Surfactants and or high shear can be utilised in order to assist in the dispersion of the autoxidisable amide group containing resin in water. Suitable surfactants include but are not limited to conventional anionic, cationic and/or non-ionic surfactants such as Na, K and NH$_4$ salts of dialkylsulphosuccinates, Na, K and NH$_4$ salts of sulphated oils, Na, K and NH$_4$ salts of alkyl sulphonic acids, Na, K and NH$_4$ alkyl sulphates, alkali metal salts of sulphonic acids; fatty alcohols, ethoxylated fatty acids and/or fatty amides, and Na, K and NH$_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The surfactants may also be polymeric surfactants which are also described as wetting agents.

If used, the amount of total surfactants used is preferably at least 0.1%, more preferably at least 1% by weight, most preferably at least 3% by weight and preferably less than 11%, more preferably less than 9% and most preferably less than 7% by weight based on the weight of the total resin material. Preferably a mixture of anionic and non-ionic surfactants are used.

Dispersing resins (another type of dispersing agent) such as W-3000 available from Perstorp or as described in EP 1870442 could also be employed instead of or in combination with more conventional surfactants.

Preferably to reduce the effect of cissing, the aqueous coating composition uses >0.1 wt %, more preferably >0.5 wt %, most preferably >1 wt % and especially >1.5 wt % of ionic surfactant by weight of autoxidisable amide group containing resin solids. Preferably the aqueous coating composition comprises <12 wt %, more preferably <9 wt %, most preferably <5 wt % of ionic surfactant by weight of autoxidisable amide group containing resin solids.

Preferably the composition if comprising anionic surfactant, comprises an anionic surfactant having less than 90 wt % EO groups, more preferably less than 70 wt % and most preferably less than 55 wt %. Preferably the composition if comprising anionic surfactant, comprises an anionic surfactant having more than 10 wt % EO groups and more preferably more than 20 wt % EO groups.

Preferably the composition if comprising anionic surfactant, comprises an anionic surfactant having phosphate or phosphonate groups.

An organic solvent may optionally be added before, during and/or after the polymerisation process for making the autoxidisable amide group containing resin to control the viscosity. Examples of solvents include water-miscible solvents such as propylene glycol based solvents, especially propylene glycol mono methyl ether and dipropylene glycol mono methyl ether and glycol ethers such as butyldiglycol. Optionally no organic solvents are added.

A co-solvent, as is well known in the coating art, is an organic solvent employed in an aqueous composition to ameliorate the drying characteristics thereof, and in particular to lower its minimum film forming temperature. The co-solvent may be solvent incorporated or used during preparation of the autoxidisable amide group containing resin or may have been added during formulation of the aqueous composition.

An advantage of the current invention is that co-solvent can, as is often required for environmental and safety reasons, be present at a very low concentrations because of the plasticising nature of the autoxidisable amide group containing resin.

Preferably the aqueous coating composition comprising the autoxidisable amide group containing resin has a co-solvent content <18 wt %, more preferably <15 wt % and especially <9 wt % by weight of solids.

Preferably the aqueous coating composition comprising the autoxidisable amide group containing resin has a co-solvent content >0 wt %, more preferably >2 wt %, most preferably >3.5 wt % and especially >5% by weight of solids.

In general, aromatic or heterocyclic nitrogen-containing ligands (except pyridine) or aromatic and aliphatic primary and secondary (di)amines were found to prolong the drying time to a considerable extent (as reported in Coordination Chemistry Reviews 249 (2005) 1709-1728). An example includes heterocyclic nitrogen-containing solvents such as N-methylpyrrolidone (NMP) and N-ethylpyrrolidone.

Preferably the aqueous coating composition comprises <13 wt %, more preferably <8 wt %, most preferably <5 wt % and especially <0.5 wt % of NMP calculated on the solids of the coating composition.

More preferably the aqueous coating composition comprises <13 wt %, more preferably <8 wt %, most preferably <5 wt % and especially <0.5 wt % on coating composition solids of nitrogen containing molecules with an evaporation rate <0.1, more preferred <0.05 (compared to Butylacetate=1.0), which are either aromatic, heterocyclic or which are aromatic and aliphatic primary and secondary (di)amines with the proviso that the wt % of nitrogen in such molecules is >5 wt % and more preferred >10 wt %.

Values for evaporation rates were published by Texaco Chemical Company in a bulletin Solvent Data; Solvent Properties (1990). These values are relative to the evaporation rate of n-butylacetate for which the evaporation rate is defined as 1.00. Determination of evaporation rates of solvents not listed in this bulletin is as described in ASTM D3539.

The drying process of the aqueous coating composition can be divided into stages for example the period of time necessary to achieve dust-free and or tack-free coatings using the tests described herein.

Preferably the dust-free time of the aqueous coating composition is ≦5 hours, more preferably ≦3 hours and most preferably ≦50 minutes.

Preferably the tack-free time of the aqueous coating composition is ≦16 hours, more preferably ≦8 hours and most preferably ≦5 hours.

Preferably the aqueous coating composition when coated onto a substrate is water resistant for 30 minutes, more preferably for 1 hour and most preferably for 3 hours after 24 hrs of drying the coating.

Preferably the aqueous coating composition when coated onto a substrate is block resistant at room temperature with a rating of 3 or more and more preferably the coating is block resistant at 52° C. with a rating of 3 or more after 24 hrs drying.

Preferably the aqueous coating composition has a pH >2.8, more preferably >3.4, most preferably >4.5 and especially >5.1. Preferably the aqueous coating composition has a pH<9.7, more preferably <8.4 and especially <7.6.

The solids content of the aqueous coating composition of the invention is preferably ≧45 wt % and more preferably ≧49 wt %. The upper limit of solids content is usually ≦72 wt %, more preferably <65 wt % and especially ≦63 wt %.

The aqueous coating composition of the invention is particularly useful as or for providing the principle component of coating formulations (i.e. composition intended for application to a substrate without further treatment or additions thereto) such as protective or decorative coating compositions (for example paint, lacquer or varnish) wherein an initially prepared composition optionally may be further diluted with water and/or organic solvents, and/or combined with further ingredients or may be in more concentrated form by optional evaporation of water and/or organic components of the liquid medium of an initially prepared composition.

The aqueous coating composition of the invention may be applied to a variety of substrates including wood, board, metals, stone, concrete, glass, cloth, leather, paper, plastics, foam and the like, by any conventional method including brushing, dipping, flow coating, spraying, and the like. They are, however, particularly useful for providing coatings on wood and board substrates. The aqueous carrier medium is removed by natural drying or accelerated drying (by applying heat) to form a coating. Accordingly in a further embodiment of the invention there is provided a coating obtainable from an aqueous coating composition of the present invention.

The aqueous coating composition of the invention may contain other conventional ingredients including pigments, dyes, emulsifiers, surfactants, plasticisers, thickeners, heat stabilisers, levelling agents, anti-cratering agents, fillers, sedimentation inhibitors, UV absorbers, antioxidants, dispersants, reactive diluents (preferably any reactive diluents have an Mn>1000 g/mol, more preferably >1500 g/mol and most preferably >2000 g/mol and preferably an Mn<5000 g/mol, more preferably <4000 g/mol and especially <3500 g/mol; preferably any reactive diluents comprise 75 to 90 wt %, more preferably 80 to 90% of fatty acid residues with an iodine value in the range of 50 to 175, more preferred 80 to 150 g $I_2$/100 g resin) waxes, neutralising agents, adhesion promoters, defoamers, co-solvents, wetting agents and the like introduced at any stage of the production process or subsequently. It is possible to include fire retardants like antimony oxide in the dispersions to enhance the fire retardant properties.

If vinyl monomers are used as a reactive diluents preferably less than 10 wt % and more preferred less than 5 wt % of the autoxidisable amide group containing resin solids should consist of vinyl polymer material which is covalently bound to a fatty acid, whereby the covalent bond is generated through a grafting reaction of a propagating vinyl radical onto the unsaturated fatty acid.

In particular, the aqueous coating compositions of the invention and formulations containing them advantageously include drier salts. Drier salts are well known to the art for further improving curing in unsaturated film-forming substances. Generally speaking, drier salts are metallic soaps, that is salts of metals and long chain carboxylic acids. It is thought that the metallic ions effect the curing action in the film coating and the fatty acid components confer compatibility in the coating medium. Examples of drier metals are cobalt, manganese, zirconium, lead, neodymium, lanthanum and calcium. The level of drier salts in the composition is typically that to provide an amount of metal within the range of from 0.01 to 0.5% by weight based on the weight of autoxidisable resin.

Drier salts are conventionally supplied as solutions in solvents for use in solvent-borne alkyd systems. They may, however, be used quite satisfactorily in aqueous coating compositions since they can normally be dispersed in such systems fairly easily. The drier salts may be incorporated into the aqueous coating composition at any convenient stage. For example the drier salts may be added prior to dispersion into water. Drier accelerators may be added to the drier salts. Suitable drier accelerators include 2,2'-bipyridyl and 1,10-phenanthroline.

In an embodiment of the present invention there is provided an aqueous coating composition comprising:
i) 42 to 65 wt % of the autoxidisable amide group containing resin as described herein;
ii) 0 to 20 wt %, more preferably 0 to 12 wt %, most preferably 0 to 5 wt % and especially 2 to 5 wt % of co-solvent; and
iii) 35 to 58 of water;
where i)+ii)+iii)=100%.

In another embodiment of the present invention there is provided an aqueous coating composition comprising:
i) 20 to 45 wt % and more preferably 25 to 40 wt % of the autoxidisable amide group containing resin as described herein;
ii) 10 to 70 wt % of water; and
iii) 10 to 40 wt % and more preferably 15 to 35 wt % of pigment, more preferably $TiO_2$;
where i)+ii)+iii)=100%; and
iv) 0 to 5 wt % and more preferably 2 to 5 wt % of co-solvent by weight of solids;
v) 0.1 to 5 wt % of thickener by weight of solids; and
vi) 0 to 10 wt % of dispersing agent by weight of solids.

Preferably when the composition is formulated as a paint, the composition comprises 2 to 10 wt % of co-solvent on paint composition, preferably 3 to 9 wt % of co-solvent, of which at least 50 wt %, more preferably at least 80 wt % and most preferably at least 95 wt % of the co-solvent has an evaporation rate higher than 0.012, more preferably higher than 0.018 and lower than 0.25 and more preferably lower than 0.21 (when compared to BuAc=1.0).

Preferably the aqueous coating composition is a one component system, meaning that preferably no additional crosslinking agents, like for instance polyaziridines, polycarbodiimides or polyisocyanates or melamines are added to the aqueous coating composition, prior to the application of the coating to a substrate.

Preferably the aqueous coating composition is free from photoinitiators and is cured without the use of radiation curing equipment.

If desired the aqueous dispersion of the invention can be used in combination with other polymer dispersions or solutions which are not according to the invention.

Preferably less than 35 wt % on total resin solids is used of polymer dispersions or solutions not according to the invention, more preferably less than 20 wt %, most preferably less than 10 wt % and especially less than 4 wt %. In other words, preferably the aqueous coating composition of the invention comprises resin solids comprising at least 65 wt %, more preferably at least 80 wt %, most preferably at least 90 wt % and especially at least 96 wt % of the autoxidisable amide group containing resin on total resin solids.

The present invention is now illustrated by reference to the following examples. Unless otherwise specified, all parts, percentages and ratios are on a weight basis. The prefix C before an example denotes that it is comparative. The term "working" means that the example is according to the invention. The term "non-working" means that it is not according to the invention (i.e. comparative).

TEST METHODS

Telegraphing

Two types of PVC substrates were used to determine the degree of telegraphing of an unpigmented coating comprising the autoxidisable resin:
1. Rough PVC substrate with a well defined and uniform rough surface available from Vink Kunststoffen B. V Didam, Holland; type Vikupor white JD11; 2 mm thickness.
   Surface analysis was carried out using a Wyko optical profilometer NT1100, and analysis of an area of 1.9× 2.5 mm, using a magnification of 2.5 resulted in Rz=25+/−5 μm (Rz is the Ten-Point Height, this is the average of the five greatest peak-to-valley separations in the scanned area and is regarded as a general value for surface roughness.)
2. Smooth PVC substrate with a well defined smooth surface available from Vink Kunstoffen B. V. Didam, Holland; Vikunyl PVC film white glossy type 206221, 3 mm thickness. Surface analysis using a Wyko optical profilometer NT1100, and analysis of an area of 1.9×2.5 mm, using a magnification of 2.5 resulted in Rz=1+/−0.25 μm [μm=microns].

The unpigmented coating composition (optionally comprising flow and wetting agents and thickeners if needed) was cast on both PVC substrates (rough and smooth) and a smooth and defect free film was obtained, resulting in a theoretical dry film thickness between 52 μm+/−6 μm. The film was dried at relative humidity levels of 50+/−5%, temperatures of 23+/−2° C. and an air flow of <0.1 m/s for 24 hrs and the gloss was measured at a 20° angle, this gloss measurement was repeated after 4 days, 7 days and 14 days. The difference in gloss readings between the films on rough and smooth PVC is a quantitative measure with respect to what degree the rough surface of the PVC is telegraphed to the surface of the dried coating. The difference in gloss readings between the films on the rough and smooth PVC substrate are interpreted as follows: the smaller the difference in gloss values, the smaller the degree of telegraphing and the better the coating hides the substrate roughness.

Gloss Measurement Method:

Gloss measurements were carried out on a BYK Gardner micro-TRI-gloss 20-60-85 glossmeter in accordance with ASTM D523-89.

Drying Time:

To test the dust-free and tack-free drying stages of the aqueous compositions prepared in the example as described below, the aqueous composition was formulated and applied to a glass plate at a wet film thickness of 80 μm. Drying time tests were performed at regular time intervals at relative humidity levels of 50+/−5%, temperatures of 23+/−2° C. and an air flow ≦0.1 m/s.

Dust-Free Time:

The dust-free time was determined by dropping a piece of cotton wool (about 1 cm$^3$ i.e. 0.1 g) onto the drying film from a distance of 25 cm. If the piece of cotton wool could be immediately blown from the substrate by a person without leaving any wool or marks in or on the film, the film was considered to be dust-free.

Tack-Free Time:

The tack-free time was determined by placing a piece of cotton wool (about 1 cm$^3$, 0.1 g) on the drying film and placing a weight of 1 kg onto the piece of cotton wool (for 10 seconds). If the piece of cotton wool could be removed from the substrate by hand without leaving any wool or marks in or on the film, the film was considered to be tack-free.

König Hardness

König hardness was determined following DIN 53157 NEN 5319 using an Erichsen hardness equipment. The values are given in seconds.

Molecular Weight Determination:

Gel permeation chromatography (GPC) analyses for the determination of polymer molecular weights were performed on an Alliance Waters 2695 GPC with three consecutive PL-gel columns (type Mixed-B, l/d=300/7.5 mm) using tetrahydrofuran (THF, HPLC grade, stabilized with 3,5-Di-tert-Butyl-4-Hydroxytoluene (BHT), preferably with 1.0 vol % acetic acid) as the eluent at 1 cm$^3$/min and using an Alliance Waters 2410 refractive index detector. A set of polystyrene standards (analysed according to DIN 55672) was used to calibrate the GPC. Samples corresponding to about 16 mg of solid material were dissolved in 8 cm$^3$ of THF The samples were regularly shaken and dissolved for at least 24 hours for complete "uncoiling" and placed on the auto-sampling unit of the Alliance Waters 2695. The injection volume was 150 μL and the column oven was established at 35° C.

Glass Transition Temperature

Differential Scanning calorimetry (DSC) was used to measure the Tg using the TA Instruments DSC Q1000 with the standard TA Instruments alumina cups of 50 μl. Flow rate was 50 ml/min nitrogen, the sample was loaded at a temperature range 20 to 25° C. The sample was equilibrated at −90° C. and then heated with 10° C./min to 100° C., kept for 5 minutes at 100° C., cooled to −90° C. with 20° C./min, kept for 5 minutes at −90° C. and subsequently heated with 10° C./min to 100° C. For sample preparation 80 to 100 μm of the resin or paint was cast on a glass plate and dried for 24 hrs in a vacuum oven at 40 to 50° C. using a reduced pressure below 20 mbar and after drying, sufficient film was removed and transferred to the alumina cup for subsequent DSC measurement.

Water Resistance:

A 100 μm wet film was cast on a Leneta chart and dried for 24 hrs at 23° C.+/−2° C. at a relative humidity of 50%+/−5% and an air flow <0.1 m/s. Then three drops of water were placed on the film and one drop of water was removed after 30 minutes, one after 1 hour and one after 3 hours. The water resistance was assessed immediately after removal of the water and after 24 hours. The rating for water resistance is from 0=very poor, dissolved, 3=acceptable, 5=excellent, no damage of the coating.

EXAMPLE 1

Autoxidisable Amide Group Containing Resin

A 2 liter, five-necked reactor flask fitted with a stirrer, a thermometer and a condenser fitted with a Dean-Stark condensate trap, was loaded with diisopropanolamine (223 g) and hexahydrophthalic anhydride (184.5 g). The reaction mixture was gradually heated under a nitrogen atmosphere to 120° C. and kept on this temperature for 1 hour. Subsequently sunflower fatty acid (442 g) was added and the mixture was gradually heated to 150° C. and kept at this temperature while reaction water was collected by applying a gradual vacuum regime to 25 mbar. The reaction was stopped when the acid value was 5.2 mg KOH/g and cooled to 110° C. The hydroxyl value was 79.3 mg KOH/g. Subsequently hexahydrophthalic anhydride (145.9 g) was added to the reaction mixture and this mixture was kept on this temperature until virtually all anhydride was reacted as judged from the Infra Red spectrum of the reaction mixture (the anhydride groups typically show two absorptions at 1785 cm$^{-1}$ and 1865 cm$^{-1}$, which disappeared and were replaced by a new ester carbonyl absorption at 1740 cm$^{-1}$). To this mixture isophorone diisocyanate (14.4 g) was added and reacted at 90° C. until all free isocyanate groups had disappeared.

To this autoxidisable amide group containing resin (81.4 g) propylene glycol propyl ether (9.0 g), Atlas G5000 (non-ionic surfactant from Uniquema, 2 g) and Disponil FES77 (anionic surfactant from Cognis, 3.3 g, 30% in water) was added, corresponding with a neutralisation degree of 0. The resultant resin contained at least 10 wt % of ring structures. Properties of the resultant resin are given in Table 1 below. Subsequently water (43.9 g) was added to this mixture to obtain an aqueous composition.

TABLE 1

|  | Example 1 |
| --- | --- |
| Solids [%] | 56.3 |
| pH | 4.9 |
| Viscosity (mPa · s)$^1$ | 150 |
| Particle size (nm) | 1460 |
| Solvent content on total dispersion [%] | 6.1 |
| Solvent content on solids [%] | 10.0 |
| Fatty acid residue content on solids [%] | 43.4 |
| AV Resin [mgKOH/g] | 52.1 |
| AV × ND [mgKOH/g] | 0.0 |
| OH# Resin [mgKOH/g] | 4 |
| Mn | 2193 |
| Mw | 7895 |
| PDi | 3.6 |
| Amide group content [mmoles/100 g] | 188 |
| Tg [° C.] (measured) | 9 |

$^1$Brookfield RVT viscosity with spindle #6

The resulting composition was siccativated using the drier mixture VWX4940 from Condea Servo, diluted 1:1 with Byk 348 (silicone surfactant from Byk) (1.2 wt % of this mixture was added). A film of the dispersion was cast on glass and tested as described herein. The film properties are listed in Table 2 below.

TABLE 2

|  |  | Example 1 |
| --- | --- | --- |
| Dust-free [minutes] |  | 135 |
| Tack-Free [minutes] |  | 300 |
| Gloss on rough PVC | 24 hours | 79.7 |
|  | 4 days | 78.5 |
|  | 1 week | 78.4 |
|  | 2 weeks | 77.9 |
| Gloss on smooth PVC | 24 hours | 83.3 |
| Telegraphing value | 24 hours | 3.6 |
| König Hardness [s] | 24 hours | 21 |
|  | 4 days | 38 |
|  | 1 week | 43 |
|  | 2 weeks | 45 |
| Water resistance | 0.5 hours | 4-5 |
|  | 1 hour | 4-5 |
|  | 3 hours | 4-5 |

The invention claimed is:

1. An aqueous coating composition comprising an autoxidisable amide group containing resin, said autoxidisable amide group containing resin having:
   i) >30 wt % of fatty acid residues, by weight of autoxidisable amide group containing resin;
   ii) a Tg in the range of from −40 to +35° C.;
   iii) the following relationship:

ND×AV<22 mg KOH/g where AV=acid value and where ND=neutralization degree of acid groups on the autoxidisable amide group containing resin; and
   iv) a Mw in the range of from 2,500 to 20,000 g/mol;
   v) a PDi less than 10;
   vi) an amide group content of at least 10 mmoles/100 g solid of autoxidisable amide group containing resin; and
   said composition having:
   b) a co-solvent content less that 25 wt % by weight of solids;
   c) a N-methylpyrrolidone content <13 wt % by weight of solids;
   d) a solids content >38 wt %;
   said composition when in the form of the film having a telegraphing value of less than 20 gloss units;
   where the telegraphing value is the difference between an initial smooth gloss value minus an initial rough gloss value of the film, where
   the initial smooth gloss value is the gloss when the film is cast on smooth PVC ($R_z$=1 μm [±0.25 μm]);
   the initial rough gloss value is the gloss when the film is cast on rough PVC ($R_z$=25 μm [±5 μm]); and where
   each film has a dry film thickness of 52 μm [±6 μm]; and
   each initial gloss value is measured at a 20° angle, one day (24 h) after the film has been cast.

2. An aqueous coating composition according to claim 1 wherein the autoxidisable amide group containing resin comprises at least 5 wt % of ring structures.

3. An aqueous coating composition according to claim 1 wherein the autoxidisable amide group containing resin comprises <5 wt % of TMA (trimellitic acid and or trimellitic anhydride).

4. An aqueous coating composition according to claim 1 wherein the autoxidisable amide group containing resin comprises <15 wt %, of phthalic acid, phthalic anhydride and or benzoic acid.

5. An aqueous coating composition according to claim 1 wherein the autoxidisable amide group containing resin has an amide group content of at least 15 mmoles/100 g solid amide group containing resin.

6. An aqueous coating composition according to claim 1 wherein the fatty acid residues have an iodine number of at least 50 g $I_2$/100 g fatty acid.

7. An aqueous coating composition according to claim 1 wherein the autoxidisable amide group containing resin is an autoxidisable urethanised amide group containing resin.

8. An aqueous coating composition according to claim 7 wherein the autoxidizable urethanised amide group containing resin comprises 1 to 20 wt %, on resin solids of isocyanates.

9. An aqueous coating composition according claim 7 wherein the autoxidisable urethanised amide group containing resin is obtained from components comprising:
  i) at least 10 to 45 wt % of acids containing a ring or anhydrides containing a ring;
  ii) 33 to 65 wt % of fatty acid residues having an iodine value between 80 and 155 g $I_2$/100 g;
  wherein the fatty acid residues contain less than 10 wt % of fatty acid residues that contain 3 or more double bonds;
  iii) 10 to 30 wt % of components with hydroxyl functionality and/or amino functionality;
  iv) 0.5 to 7 wt % of polyisocyanate;
  wherein i)+ii)+iii)+iv)=100%.

10. An aqueous coating composition according to claim 1 wherein the autoxidisable amide group containing resin has an hydroxyl number of <60 mg KOH/g.

11. An aqueous coating composition according to claim 1 wherein the aqueous coating composition comprises:
  i) 42 to 65 wt % of the autoxidisable amide group containing resin;
  ii) 0 to 20 wt % of co-solvent; and
  iii) 35 to 58 of water;
  where i)+ii)+iii)=100%.

12. An aqueous coating composition according to claim 1 wherein the aqueous coating composition comprises:
  i) 20 to 45 wt % of the autoxidisable amide group containing resin;
  iii) 10 to 70 wt % of water; and
  iii) 10 to 40 wt % of pigment;
  where i)+ii)+iii)=100%; and
  iv) 0 to 5 wt % of co-solvent by weight of solids;
  v) 0.1 to 5 wt % of thickener by weight of solids; and
  vi) 0 to 10 wt % of dispersing agent by weight of solids.

13. An aqueous coating composition according to claim 1 comprising >0.1 wt % and <12 wt % of ionic surfactant by weight of autoxidisable amide group containing resin solids.

14. An aqueous coating composition according to claim 1 comprising <13 wt % on coating composition solids of nitrogen containing molecules with an evaporation rate <0.1.

15. An aqueous coating composition according to claim 1 comprising resin solids comprising at least 65 wt % of the autoxidisable amide group containing resin on total resin solids.

16. An aqueous coating composition according to claim 1 wherein the initial rough gloss value minus the rough gloss value measured at 4 days after film formation is less than 10 gloss units.

17. A substrate coated with an aqueous coating composition according to claim 1.

18. A method for coating a substrate comprising applying the aqueous coating composition according to claim 1 to the substrate and then drying the aqueous composition to form a coated substrate.

19. A paint comprising an aqueous coating composition according to claim 1.

* * * * *